Patented Mar. 22, 1938

2,112,210

UNITED STATES PATENT OFFICE 2,112,210

PROCESS OF MANUFACTURE OF SULPHUR CONTAINING PROTEIN COMPOUNDS

Oskar Huppert, Vienna, Austria

No Drawing. Application June 20, 1935, Serial No. 27,528. In Austria June 21, 1934

4 Claims. (Cl. 260—9)

This invention relates to the manufacture of sulphur containing protein hydrolysate products.

It is well known to transform hydrolysates obtained from proteins with alkalis or earth alkalis into sulphurated protein compounds by means of carbon disulphide. Such compounds have been described in the German Patent No. 192,344, Kl., 221, German Patent No. 238,843, Kl., 12p and the French Patent No. 395,402. It was proposed to use these products as well as their metallic reaction products for pharmaceutical purposes in German Patent 264,926. All these sulphurated alkali protein solutions however are decomposed by mineral acids and are not autoxidizable.

Now I have found that solutions of protein hydrosylates the hydroxyl ion concentration of which is not higher as it would amount to in solutions of calcium oxide in water—1.4 grams CaO per liter—shows acid reaction after sulphidation of the same with carbon disulphide. Furthermore, those products especially in the presence of air, are autoxidizable. Through the sulphidation, the amino groups are transformed into carbamindithio-groups of the formula —NHCSSH. Only such aciduous salt solutions of sulphurated protein hydrolysates are transformed into red salts by condensation under ordinary room temperature and under liberation of hydrogen sulphide and separation of sulphur. These salts will not be decomposed in mineral acid solutions, even when boiling. As catalysts which accelerate the autoxydation in the presence of air flowers of sulphur, ferrous salts, ferrous sulphide, other metal sulphides, metal powders, especially iron, copper, mercury as well as manganese peroxide, are recommended. The oxidation may also be carried out only by heating of the sulphurized solutions with superoxide of manganese or with flowers of sulphur.

The products of my invention have a pigment character through the liberation of hydrogen sulphide and by means of oxidation and cyclic connections.

The hydrolysis of protein leads up, as known, to amino acids consequently one obtains red solutions of the same chemical properties if one takes as initial material the essential parts of the proteins i. e. alpha amino acids. The chemical process takes place according to the equation:

$4NH_2CHRCOOH + 2CS_2 + O =$
$\qquad 3H_2O + 2H_2S + C_{10}R_4H_6O_6N_4S_2$

From the red salts obtained in form of their alkali earth metal or magnesium salts, the free yellow acids will be produced through addition of mineral acids to the waterous solutions. The mineral acid salts obtained thereby are separated either by filtration or dialysation.

The hydrolysis used in carrying out my process if they have been obtained from hydroxides soluble with difficulty only, are free from any excess of hydroxide by filtration, so that the solutions have a hydroxyl ion concentration only, corresponding to the solubility of calcium hydroxide in water. In case the hydrolysates are obtained from easily soluble hydroxides, the amounts equivalent to the initial material are immediately used for the hydrolysis, so that a later separation of an excess amount is not necessary.

The solutions of the acids which are obtained from bone glue or gelatine have the power to completely prevent the growth of the so called blue and yellow coli bacteria. (Wiener Mediz. Wochenschrift 21, 1934 "Das Protein und seine stereoisomeren Modifikationen" Vienna 1933 by Huppert.)

These compounds therefore have the capability to regulate the bacteria of people afflicted with cancer and to be efficient as a prophylactic with healthy people.

Example 1

1 kg. gelatine—bone glue—is boiled during 2-3 hours in 5 liters of fresh water, into which have been mixed previously 56 g. of caustic lime and slacked. Care has to be taken that the volume of the liquid amounts to 3 liters after heating is done. After being cooled to 40–50° C. the mixture is filtered, and the glutose-calcium solution thus obtained is boiled under reflux with about 120 cc. of carbon disulphide. After cooling the excess carbon disulphide is separated and the thiohydantoin-leuco solution so obtained is mixed and stirred well with about 50 g. of manganese peroxide or with about 2 g. sulphate of iron or 3 g. sulphide of zinc or sulphide of iron or 50 g. iron powder. Through activation of the oxygen of the air by means of oxidation the yellow— brown leuco—solution is transformed into blood red salt solution under liberation of hydrogen sulphide and sulphur. After one hour during repeated shaking or introduction of air, the product is separated under ordinary temperature, from the catalysts and from the calcium sulphate formed after being allowed to stand further 24 hours. The salt then is obtained in solution, from which the yellow acid is produced by addition of sulphuric acid, detected by the color change from red to yellow. The yield amounts to 90%, calculated on waterfree bone glue.

Example 2

The glutose-calcium solution obtained according to Example 1, which also may be produced by fermentative dissociation, for instance with trypsin, are sulphurized and mixed and boiled with about 50 g. of flowers of sulphur. After 5 minutes, the leuco-solution becomes blood red and hydrogen sulphide escapes. After further boiling of about 20 minutes the transformation into the product is completed. The solution is filtered from the sulphur and the following operation is exactly as stated in Example 1.

Example 3

75 g. glycocoll are dissolved in 500 cc. of water to which 27 g. $Ca(OH)_2$ were previously added. The excess lime then is filtered off, and the solution after addition of 70 cc. of carbon disulphide is boiled one hour under reflux. About 20 g. of flowers of sulphur are added and boiled strongly for half an hour. The sulphur is filtered out and the blood red solution is treated with about 49 g. of sulphuric acid until the color changes into yellow. The solution is evaporated and separating glycocoll salt is sucked off. The mother liquor is treated with ether or alcohol, and the yellow acid is obtained as an oil and then in crystal form.

Example 4

10 g. alanin, or 10 g. phenylalanin or 10 g. histidin or 10 g. thyrosin sulpho acid are dissolved each in 5 g. $CaOH_2$ and in 500 cc. water and filtered. The product is sulphurized and the solutions boiled with about 5 g. of flowers of sulphur. The solution is filtered from the sulphur and the following operation is exactly as stated in Example 3.

The effectualness of my novel series of compounds has been tested especially in the use as pharmaceutical and therapeutic compounds. The sulphur containing protein compounds has been found very efficient in the treatment of cancer carcinoma and as a preventative in this line.

It will be understood that the detailed procedures described are capable of wide variation and modification without departing from the spirit of this invention.

Having now particularly described and ascertained the nature of my said invention and in what manner the same is to be performed, I declare that what I claim is:

1. The process of manufacturing protein hydrolysate products containing sulphur, which comprises reacting carbon disulphide with a protein hydrolysate at a hydroxyl ion concentration which at most corresponds to that of a solution of calcium hydroxide, the sulphurized products thus obtained being oxidized in aqueous solution under liberation of hydrogen sulphide by means of oxidation catalysts.

2. The process of manufacturing protein hydrolysate products containing sulphur, which comprises reacting carbon disulphide with a protein hydrolysate at a hydroxyl ion concentration which at most corresponds to that of a solution of calcium hydroxide, the sulphurized products thus obtained being oxidized in aqueous solution by means of manganese of peroxide.

3. The process of manufacturing protein hydrolysate products containing sulphur, which comprises reacting carbon disulphide with a protein hydrolysate at a hydroxyl ion concentration which at most corresponds to that of a solution of calcium hydroxide, the sulphurized products thus obtained being oxidized in aqueous solution by means of flowers of sulphur.

4. The process of manufacturing protein hydrolysate products containing sulphur, which comprises reacting carbon disulphide with alpha amino acids at a hydroxyl ion concentration which at most corresponds to that of a solution of calcium hydroxide, the sulphurized products thus obtained being oxidized in aqueous solution by means of flowers of sulphur.

OSKAR HUPPERT.